No. 829,610. PATENTED AUG. 28, 1906.
E. P. TURNER.
ANIMAL EXTERMINATOR.
APPLICATION FILED NOV. 28, 1905.
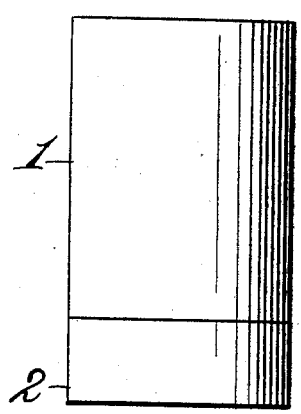
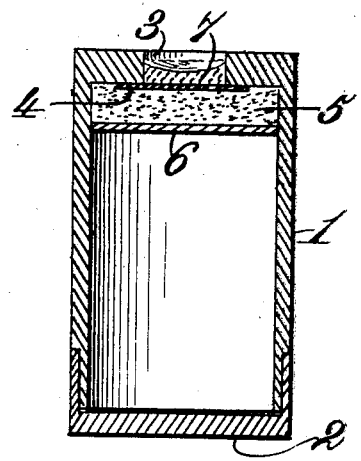
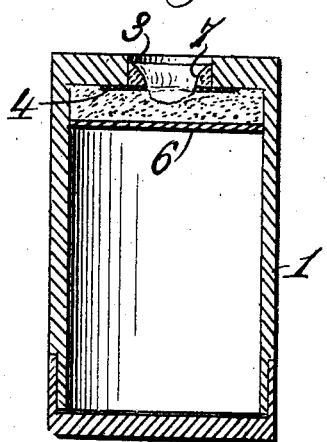
Witnesses.
Inventor,
Edward P. Turner.
By James L. Norris.
Atty.

UNITED STATES PATENT OFFICE.

EDWARD P. TURNER, OF NEW YORK, N. Y.

ANIMAL-EXTERMINATOR.

No. 829,610.  Specification of Letters Patent.  Patented Aug. 28, 1906.

Application filed November 28, 1905. Serial No. 289,477.

*To all whom it may concern:*

Be it known that I, EDWARD P. TURNER, a citizen of the United States, residing at New York, in the county of New York and State of New York, have invented new and useful Improvements in Animal-Exterminators, of which the following is a specification.

This invention relates to an exterminator for mice and other small rodents having pest characteristics, and is particularly intended for use in orchards.

The invention consists, essentially, of a normally closed receptacle having an enticing poisonous mixture therein and an opening in one end covered by a thin septum treated to render it moisture-proof and through which the animal gnaws to reach the mixture.

The invention further consists in the details of construction and arrangement of parts, which will be more fully hereinafter set forth.

In the drawings, Figure 1 is an elevation of an exterminator embodying the features of the invention. Fig. 2 is a transverse vertical section. Fig. 3 is a view similar to Fig. 2, showing the septum mutilated and the mixture in the receptacle exposed through the end opening.

Similar numerals are used to indicate corresponding parts in the several views.

The numeral 1 designates a receptacle, preferably cylindrical and of suitable material. This receptacle has a removable cover 2 at one end and an opening 3 in the opposite end. The opening 3 is normally closed or sealed by a thin septum 4, of paper, disposed against the inner side of the end having the opening 3 therein. A poisonous food mixture 5 of corn-meal and arsenic, preferably in the form of paris-green, is placed in the receptacle against the septum 4 and retained in a compact body by a disk 6, inserted in the receptacle and firmly held against said mixture. After the mixture has been arranged in the receptacle, as set forth, melted tallow 7 is poured into the opening 3 over the septum 4 to render this particular portion of the receptacle moisture-proof and protect the mixture.

The general dimensions of the parts of the device may be modified indefinitely, and the poisonous mixture may also be varied. The essential feature of the exterminator is to confine an enticing or palatable mixture in a receptacle and rendered accessible by a readily-destructible septum or partition exposed through and covering an opening in the said receptacle.

The exterminator or a number of the latter are disposed in an orchard or other place in such position that the opening leading to the septum or partition 4 may be easily reached. The mice or other animals reach the poisonous mixture by gnawing through the septum, and the arsenic or other poison in the mixture acts with deadly result. Each receptacle will have such quantity of the mixture therein that it will last for a considerable length of time without replenishment. In replenishing the receptacle the same course is pursued as heretofore set forth.

The exterminator will be found exceptionally advantageous for the purpose set forth, and being simple in its organization can be manufactured at a minimum cost.

The grease or melted tallow 7 coloring the outside of the septum or disk 4 also serves as an alluring bait, as well as a protection to the septum.

Having thus described the invention, what is claimed is—

1. An exterminator of the class set forth consisting of a receptacle containing a poisonous substance and provided with an opening to give access to said substance, and a destructible septum normally covering said opening.

2. An exterminator of the class set forth containing a poisonous substance and having a destructible septum over a portion of said substance.

3. An exterminator of the class set forth having a poisonous substance partially shielded and rendered exteriorly accessible by a readily-destructible septum.

4. An exterminator of the class set forth having a poisonous food substance therein normally shielded by a destructible septum.

5. An exterminator of the class set forth having a poisonous substance therein normally covered in part by a destructible septum with a waterproofing material thereon.

6. An exterminator of the class set forth having a poisonous substance therein normally covered in part by a destructible septum having waterproof material applied thereto.

7. An exterminator of the class set forth containing a poisonous food material, and a destructible septum to render the material exteriorly accessible.

8. An exterminator embodying a receptacle with an opening therein, a destructible septum over the opening, a poisonous material held against the septum, and a partition device in the exterminator engaging the material to hold the latter in compact form.

9. An exterminator embodying a receptacle with an opening therein, a destructible septum over the opening, a poisonous material held against the septum, a partition device in the exterminator engaging the material to hold the latter in compact form, and a waterproofing substance applied over the septum.

10. An exterminator embodying a closed receptacle with an opening in one end, a destructible septum over the inner portion of the opening, a poisonous food material held against the septum, and a waterproof material applied in said opening over the septum.

In testimony whereof I have hereunto set my hand in presence of two subscribing witnesses.

EDWARD P. TURNER.

Witnesses:
MICHAEL S. IVERSON,
FLORIEN ROMAND.